(12) United States Patent
Knapp

(10) Patent No.: US 9,472,990 B2
(45) Date of Patent: Oct. 18, 2016

(54) SYSTEMS AND METHODS FOR INSULATING Y-POINTS OF THREE PHASE ELECTRIC MOTORS

(75) Inventor: John M. Knapp, Claremore, OK (US)

(73) Assignee: Baker Hughes Incorporated, Houston, TX (US)

(*) Notice: Subject to any disclaimer, the term of this patent is extended or adjusted under 35 U.S.C. 154(b) by 1336 days.

(21) Appl. No.: 12/907,519

(22) Filed: Oct. 19, 2010

(65) Prior Publication Data
US 2012/0093666 A1    Apr. 19, 2012

(51) Int. Cl.
    *H02G 3/02*     (2006.01)
    *H02K 3/38*     (2006.01)
    *H02K 5/132*   (2006.01)

(52) U.S. Cl.
    CPC ............... *H02K 3/38* (2013.01); *H02K 5/132* (2013.01); *Y10T 29/49009* (2015.01)

(58) Field of Classification Search
    CPC ............ H01J 5/20; H01B 3/20; H01B 3/22; H05K 5/00; H05K 5/02; H05K 5/0004; H02G 3/08; B60R 16/0239; H02K 3/38; H02K 5/132; Y10Y 29/49009
    USPC .......... 439/42; 62/508; 174/17 R, 17 LF, 50, 174/520, 559
    See application file for complete search history.

(56) References Cited

U.S. PATENT DOCUMENTS

| | | | | |
|---|---|---|---|---|
| 2,662,735 A * | 12/1953 | Arutunoff | | 175/40 |
| 3,825,148 A * | 7/1974 | Hunter et al. | | 220/359.1 |
| 4,082,866 A * | 4/1978 | Link | | H01F 27/321 |
| | | | | 174/15.1 |
| 4,196,408 A * | 4/1980 | Link | | 336/94 |
| 4,211,625 A * | 7/1980 | Vandevier et al. | | 204/196.05 |
| 4,451,750 A * | 5/1984 | Heuer | | H02K 5/225 |
| | | | | 310/71 |
| 5,095,612 A * | 3/1992 | McAvena | | 29/596 |
| 5,159,978 A * | 11/1992 | Tomek | | E21B 17/028 |
| | | | | 166/254.2 |
| 5,207,273 A * | 5/1993 | Cates et al. | | 417/423.3 |
| 6,021,040 A * | 2/2000 | Suzuki et al. | | 361/514 |
| 6,028,523 A | 2/2000 | Thibodeaux | | |

(Continued)

FOREIGN PATENT DOCUMENTS

| | | |
|---|---|---|
| JP | 2005-171310 | 6/2005 |
| JP | 2005-207328 | 8/2005 |

OTHER PUBLICATIONS

Sever, "Three Phase Induction Motors: Welded Construction, 6000 V, 50 Hz, 200-2500 kW", http://www.roel-etk.ru/PDF/Sever.pdf, 1999.

*Primary Examiner* — Angel R Estrada
*Assistant Examiner* — Pete Lee
(74) *Attorney, Agent, or Firm* — Law Offices of Mark L. Berrier

(57) ABSTRACT

Systems and methods for insulating the Y-points of three-phase electric motors commonly used in ESP systems, in which the Y-points are not grounded or tied to a reference voltage, and may consequently experience high voltages. One embodiment is an apparatus for insulating the Y-point of the motor using an electrically insulating enclosure. The enclosure has apertures that extend from a cavity therewithin the to the exterior of the enclosure. The cavity accommodates the Y-point of the motor. The conductors which are connected at the Y-point junction extend from the cavity to the coils of the three-phase motor, and possibly to an instrument package. Seals are formed at the apertures to provide an electrically insulating barrier between the Y-point and the exterior of the enclosure. The cavity may be filled with an insulating material such as potting compound or oil.

20 Claims, 5 Drawing Sheets

(56) References Cited

U.S. PATENT DOCUMENTS

| | | | |
|---|---|---|---|
| 6,176,308 B1 * | 1/2001 | Pearson | 166/65.1 |
| 6,273,754 B1 * | 8/2001 | Bunch et al. | 439/587 |
| 6,456,179 B1 * | 9/2002 | Backa et al. | 336/57 |
| 6,471,522 B2 * | 10/2002 | Kendall | 439/42 |
| 6,873,080 B1 | 3/2005 | Leijon | |
| 6,936,947 B1 | 8/2005 | Leijon | |
| 7,061,133 B1 | 6/2006 | Leijon | |
| 7,197,892 B2 * | 4/2007 | Ioi et al. | 62/508 |
| 2004/0253124 A1 | 12/2004 | Nobuyasu | |
| 2007/0138176 A1 * | 6/2007 | Gawlick | 220/4.26 |

* cited by examiner

SYSTEMS AND METHODS FOR INSULATING Y-POINTS OF THREE PHASE ELECTRIC MOTORS

BACKGROUND

1. Field of the Invention

The invention relates generally to three-phase electric motors, and more particularly to systems and methods for insulating the Y-points of three-phase electric motors in which the Y-points are not grounded or tied to a reference voltage, and may consequently experience high voltages.

2. Related Art

Three-phase electric motors are commonly used in many different applications. One type of system in which three-phase electric motors are predominantly used is an electric submersible pump (ESP) system. ESP's are used in the oil and gas production industries to produce these fluids from wells. Three-phase motors can be designed to fit within the narrow confines of a well, yet still produce the substantial amount of lifting power required to pump the fluids from the wells, which may be thousands of feet deep.

Three-phase electric motors typically use either a "Y" configuration or a "delta" configuration. These motors may also be referred to as "Y-wound" or "delta-wound" motors. A three-phase motor has three coils (or sets of coils) which generate the magnetic fields that drive the motor. In a "Y" configuration, power is applied to one end of each coil (each coil receiving a different phase of the three-phase power), and the second end of each coil is tied to the others at a junction that is referred to as the Y-point. The term "Y-point" refers to the fact that the three conductors from the coils form a "Y" at the junction. The Y-point is also sometimes referred to as the "Wye"-point. In a delta configuration, rather than having the second end of each coil tied together at a single junction, the first end of each coil is tied to the second end of one of the other coils. This can be represented diagrammatically by a triangle, with each side of the triangle representing one of the coils. In a delta configuration, power is applied to the corners of this triangle.

The three-phase electric motors that are employed in ESP systems predominantly use the Y-configuration. Three-phase power is supplied to the motor through a cable that runs from a power source at the surface of the well, through the well to the motor of the ESP system. Each phase is applied to a first end of one of the coils of the motor. As noted above, the second end each of the coils is tied to the others at the Y-point. The Y-point is not connected to anything else, and is intended to be electrically isolated from anything else. The Y-point is therefore electrically insulated to ensure that it is isolated. Because the Y-point is a junction of three conductors, however, it is difficult to insulate the Y-point well using conventional techniques.

During normal operation, the voltage at the Y-point is very low. In an ideal system, the sum of the voltages of each of the three phases would be zero. When the voltage at the Y-point is low, there is little electrical stress on the insulation of the Y-point. There are instances, however, when the voltage of the Y-point becomes very high, and the insulation of the Y-point can fail. For instance, one of the conductors of the cable or motor can become electrically connected to ground. This can occur in the motor laminations, shaft, or housing. (Another type of "short" would be an energized-conductor-to-energized-conductor fault, which this invention does not address.) The motor can continue to operate in this condition, but as a result, the voltage at the Y-point (which is the sum of the three phases) increases substantially. If the increased voltage at the Y-point causes it to short out as well, the motor will fail. Because of the expense associated with retrieving the failed motor from the well to replace it, this is a very serious problem.

It would therefore be desirable to provide systems and methods for insulating the Y-points of three-phase electric motors so that they can withstand voltages up to or exceeding the motor nameplate voltage, particularly in applications such as ESP systems.

SUMMARY OF THE INVENTION

This disclosure is directed to systems and methods for insulating the Y-points of three-phase electric motors in which the Y-points are not grounded or tied to a reference voltage, and may consequently experience high voltages. These types of motors are commonly used in downhole applications such as ESP systems.

One embodiment is an apparatus for insulating a Y-point in a three-phase electric motor which may, for example, be used to drive an ESP. The apparatus includes an electrically insulating enclosure. The enclosure has one or more apertures that extend from a cavity within the enclosure to the exterior of the enclosure. The cavity is designed to accommodate the Y-point junction of the three-phase motor. Three conductors which are connected at the Y-point junction extend from the cavity to the coils of the three-phase motor. One or more insulating seals are formed at the apertures to provide an electrically insulating barrier between the Y-point junction and the exterior of the enclosure. The portion of the cavity that is not occupied by the Y-point junction may be filled with an insulating material such as potting compound or oil. The potting compound may serve to seal the apertures around the conductors. If the cavity is filled with oil, rubber o-rings may be used to form the seals at the apertures.

In one embodiment, the enclosure consists of a top cap and a bottom cap, where the two caps and are configured to be secured to each other, such as by screwing or snapping the caps together. The enclosure may be formed of a rigid, electrically insulating material such as PEEK, although other types of materials may be used. The apertures through the enclosure may be designed to enable an instrument power conductor to extend from the cavity within the enclosure to the exterior of the enclosure in order to provide power to a gauge package.

An alternative embodiment comprises an ESP for use in downhole applications. This system includes a pump and a motor which is coupled to the pump and configured to drive the pump. The motor is Y-wound and utilizes three-phase power that is provided to the system. The motor includes an electrically insulating enclosure which forms a cavity designed to accommodate the Y-point junction of the motor. The enclosure has apertures therethrough which enable three conductors which are connected at the Y-point junction to extend from the cavity to the exterior of the enclosure. These conductors are connected to the coils of the motor. The enclosure has insulating seals at the apertures which provide an electrically insulating barrier between the Y-point junction and the exterior of the enclosure. An insulating material may be used to fill the cavity around the Y-point junction. The enclosure may be positioned within a housing around the motor, and the space between the enclosure and the motor housing may be filled with oil.

Another alternative embodiment comprises a method for insulating the Y-point within a three-phase induction motor. The method includes providing an electrically insulating enclosure which forms a cavity that accommodates the Y-point junction of the motor and has one or more apertures that extend from the interior to the exterior of the enclosure. The three conductors which extend from the coils of the motor to the Y-point junction are placed through the apertures, and the Y-point junction is enclosed within the enclosure. The apertures of the enclosure are sealed, and the enclosure forms an electrically insulating barrier between the cavity within the enclosure and the exterior of the enclosure. An instrument power conductor may also be placed through the apertures, where the instrument power conductor extends from the Y-point junction to an instrument package. The method may include filling the enclosure with an electrically insulating material such as potting compound or oil prior to enclosing the Y-point junction within the enclosure.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
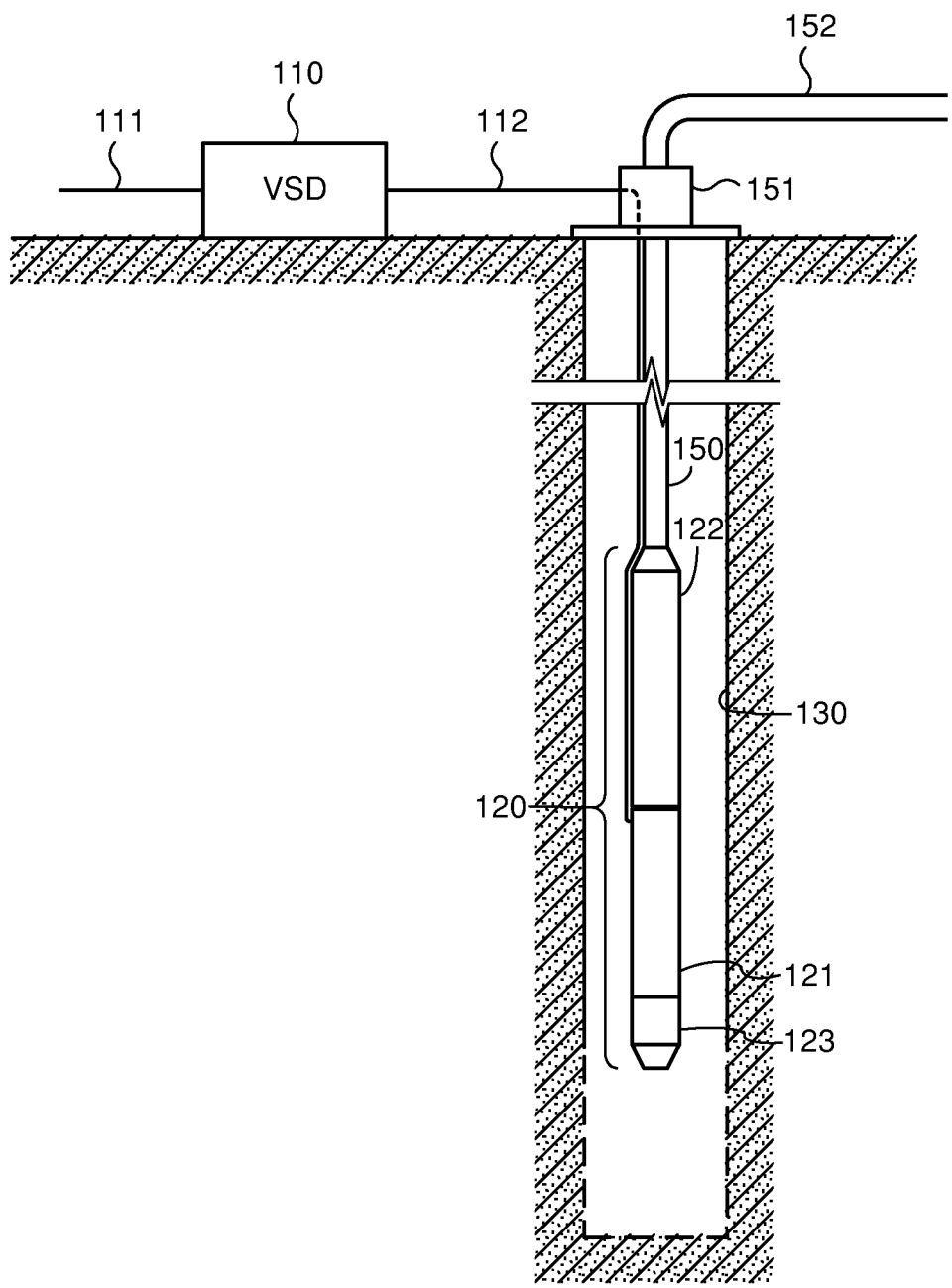
FIG. 1 is a diagram illustrating the implementation of a three-phase motor in a downhole ESP system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for insulating the Y-points of three-phase electric motors commonly used in ESP systems, where the Y-points are not grounded or tied to a reference voltage, and may consequently experience high voltages.

The present systems and methods utilize an insulating enclosure around the Y-point of a three-phase induction motor to prevent electrical contact between the Y-point and the motor housing or other grounded or energized points within the motor. The enclosure is formed so that the Y-point can be contained within it. Holes are provided through the enclosure to allow the wires that are joined at the Y-point to extend through the enclosure. Seals are formed between the wires and the holes to block conductive paths through the enclosure. An insulating material such as potting compound may be used to fill the space in the enclosure around the Y-point to increase the electrically insulating barrier around the Y-point.

Referring to FIG. 1, a diagram illustrating an exemplary pump system is shown. A wellbore 130 is drilled into an oil-bearing geological structure and is cased. The casing within wellbore 130 is perforated at the lower end of the well to allow oil to flow from the formation into the well. ESP 120 is coupled to the end of tubing string 150, and the ESP and tubing string are lowered into the wellbore to position the pump in a producing portion of the well. A variable speed drive 110 which is positioned at the surface is coupled to pump 120 by power cable 112, which runs down the wellbore along tubing string 150.

Pump 120 includes an electric motor section 121 and a pump section 122. A gauge package 123 is attached to the bottom of motor section 121. (Pump 120 may include various other components which will not be described in detail here because they are well known in the art and are not important to a discussion of the invention.) Motor section 121 is operated to drive pump section 122, which pumps the oil through the tubing string and out of the well.

In this embodiment, motor section 121 uses a three-phase induction motor which is driven by variable speed drive 110. Variable speed drive 110 receives AC input power from an external source such as a generator or power grid (not shown in the figure) via input line 111. Drive 110 rectifies the AC input power and then produces three-phase AC output power at a voltage and frequency that is suitable to drive motor section 121 of pump 120. This output power is provided to motor section 121 via power cable 112.

It is possible in ESP systems to use motors that have various configurations, including delta-wound and Y-wound configurations. Most ESP systems employ Y-wound motors. Y-wound motors may have either a grounded Y-point or an ungrounded Y-point.

The present disclosure is directed to systems that use Y-wound motors that have an ungrounded Y-point. These motors may provide several advantages in ESP systems. For instance, if one of the phases becomes grounded (e.g., as a result of the corresponding conductor of the power cable shorting to the housing of the motor), a Y-wound motor with a grounded Y-point will stop, but a motor with an ungrounded Y-point will continue to run. This can substantially increase the downhole operating life of the system. The use of a motor with an ungrounded Y-point also allows DC current to be impressed on one of the phases of the power cable, resulting in a DC voltage at the Y-point which can be used to provide power to a gauge package or other sensors.

Figure 2:
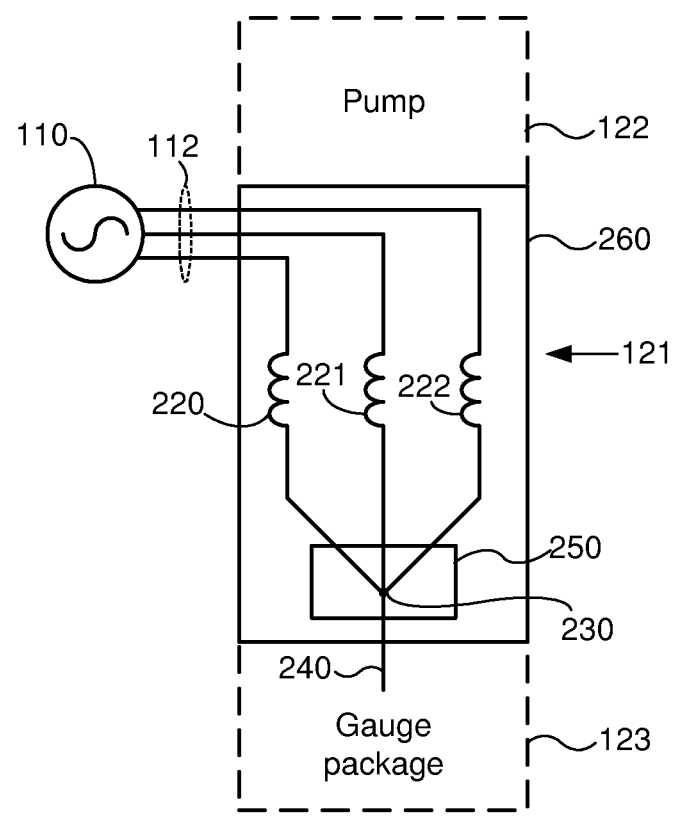
FIG. 2 is a diagram illustrating the structure of a three-phase electric motor using an ungrounded Y-configuration in accordance with one embodiment.

Referring to FIG. 2, a diagram illustrating the structure of a three-phase electric motor using an ungrounded Y-configuration in accordance with one embodiment is shown. As explained above, motor 121 is coupled to pump 122 and is configured to drive the pump to lift fluid out of the well. Three-phase power is supplied by a power source such as variable speed drive 110 through cable 112. Cable 112 has three conductors, each of which is connected to the first end of a corresponding one of coils 220-222. It should be understood that the portion of the conductors which extends from the Y-point to the coils is insulated wire. The second end of each of coils 220-222 is connected to the others at Y-point 230. In this embodiment, a fourth conductor 240 is also tied to Y-point 230. As will be discussed in more detail below, instrument power conductor 240 carries DC power to gauge package 123, which is connected to the lower end of motor 121. Conductor 240 may also be used by the gauge package to communicate with surface equipment. (It should be understood that the portions of the conductors which extend from the Y-point to the coils or instrumentation utilize insulated wire.)

As depicted in FIG. 2, Y-point 230 is positioned within an enclosure 250. Enclosure 250 is constructed using an insulating material and provides an electrically insulating barrier between Y-point 230 and the housing 260 of motor 121. Seals may be provided to improve the electrical isolation of Y-point 230 from motor housing 260. Enclosure 250 may be filled with oil or potting compound to further improve the electrical insulation between Y-point 230 and motor housing 260.

Figure 3A:
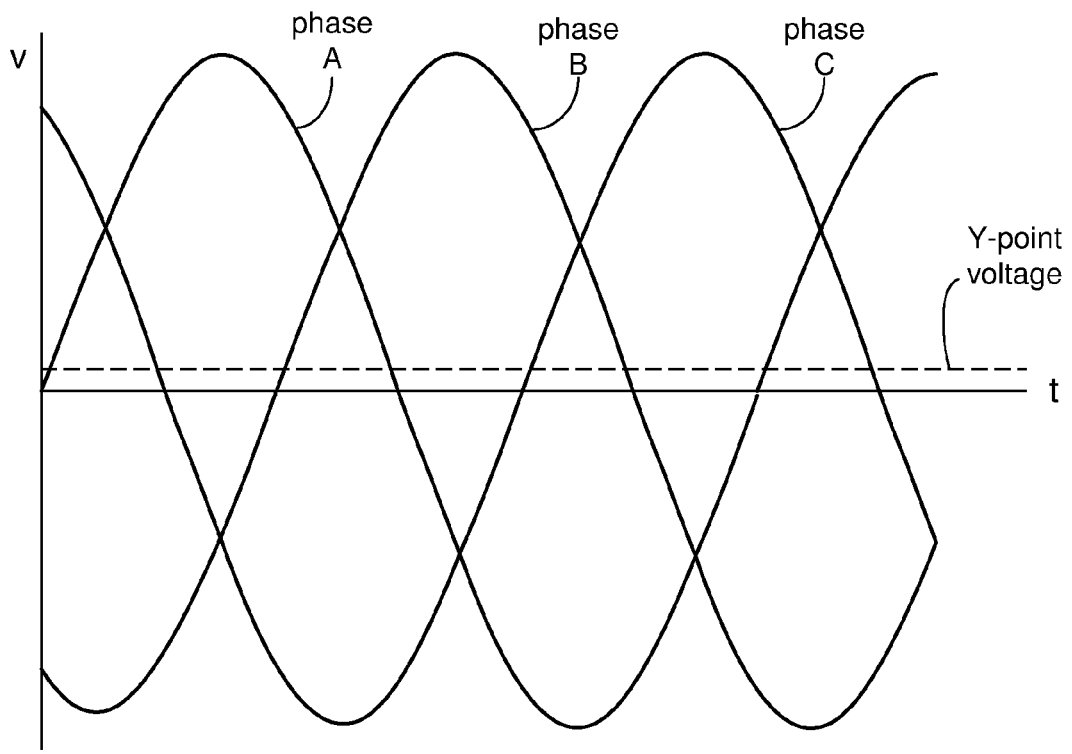
FIG. 3A is a diagram illustrating the three phases that are provided to the three coils of a three-phase induction motor, as well as the Y-point voltage.

Because the second end of each coil of the motor is tied together at the Y-point, the voltage at the Y-point is essentially the sum of the voltages that pass through each coil. During normal operation, these voltages are sinusoidal and have roughly the same magnitude. Each phase of the three-phase power is 120° out of phase from the others. This is illustrated in FIG. 3A. The sum of these signals is near 0. A DC voltage may be added to one of the phases so that the voltage at the Y-point is non-zero (as shown by the dashed line in the figure). This may be done so that the Y-point voltage can be provided to the gauge package (via conductor 240) to power the package. The gauge package may be configured to modulate its resistance, thereby modulating the DC power drawn through the Y-point. This technique can be used to communicate data from the gauge package, through the power cable to equipment at the surface of the well.

Figure 3B:
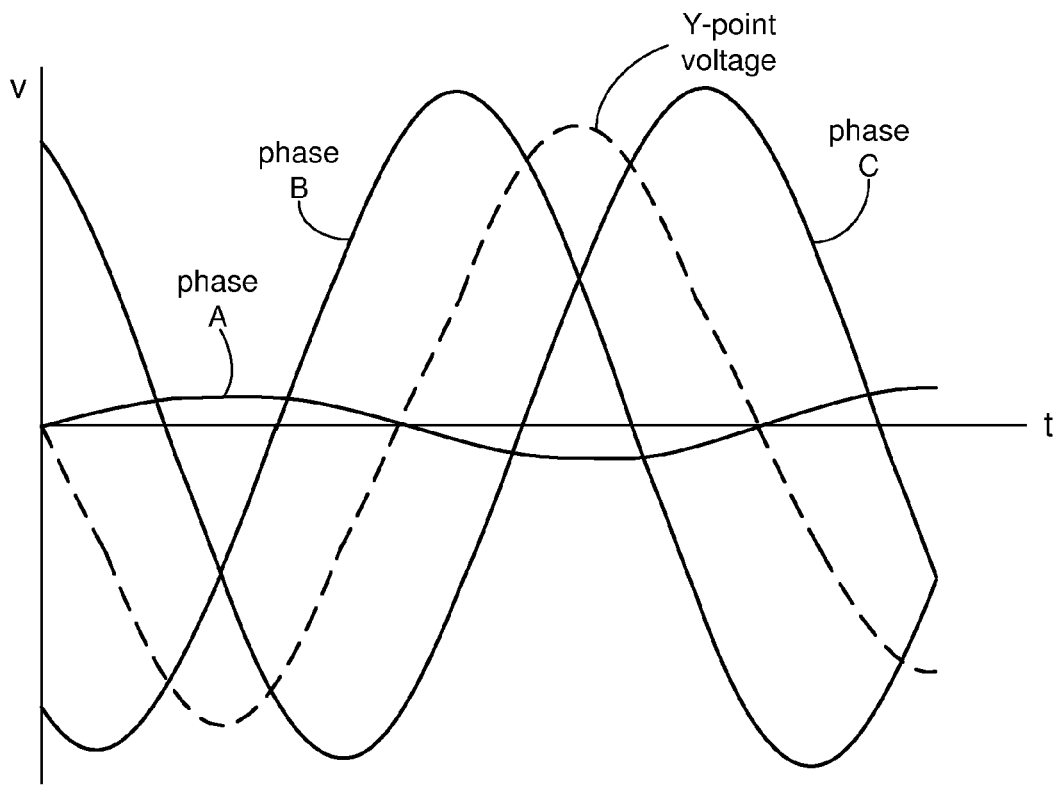
FIG. 3B is a diagram illustrating the phases that are provided to the coils of a three-phase induction motor, as well as the Y-point voltage, when one of the phases is grounded.

As noted above, there may be failures in the system which cause the voltage at the Y-point to be substantially higher than the near-zero or DC voltage that is present during normal operation. For example, it is sometimes the case that the insulation around the conductors of power cable or motor coils 220-222 will fail and create a short circuit between one of the conductors and the housing of the motor. In the event of such a short circuit, the failed point of the corresponding coil of the motor will be tied to ground potential, and the Y-point potential will shift away from ground potential. The result is a substantially sinusoidal voltage at the Y-point which may have a magnitude of several thousand volts. This is illustrated in FIG. 3B, wherein the Y-point voltage is depicted by the dashed line.

In conventional ESP motors, the Y-point may be insulated, for example, by covering the junction of the conductors with shrink-wrap insulation or electrical tape. Neither of these typically fits well within the narrow gaps created by the small angles between the conductors as they approach the junction of the Y-point. While this insulation may be sufficient to prevent short-circuits between the Y-point and the motor housing when the Y-point voltage is low, the grounding of one of the phases will usually cause the Y-point voltage to be sufficiently high to prevent a substantial risk of a short circuit between the Y-point and the housing. If such a short-circuit occurs, the motor will cease to operate.

It should be noted that, in conventional ESP motors that are designed for downhole applications, the motor housing is typically filled with oil, which is a good insulator. As the motor is used, however, contaminants are introduced into the oil, and these contaminants may reduce the electrically insulating properties of the oil. For instance, operation of the motor may create metal shavings which are suspended in the oil. These metal shavings may create an electrical path through which electricity can be conducted between the Y-point and the motor housing, thereby shorting out the Y-point.

In the various embodiments of the present invention, the Y-point is positioned within an enclosure that provides an electrically insulating barrier between the Y-point and the motor housing. As a result, there is a substantial reduction in the likelihood of a short circuit between the Y-point and the motor housing, even when one of the phases is grounded, causing the voltage at the Y-point to be very high.

Figure 4:
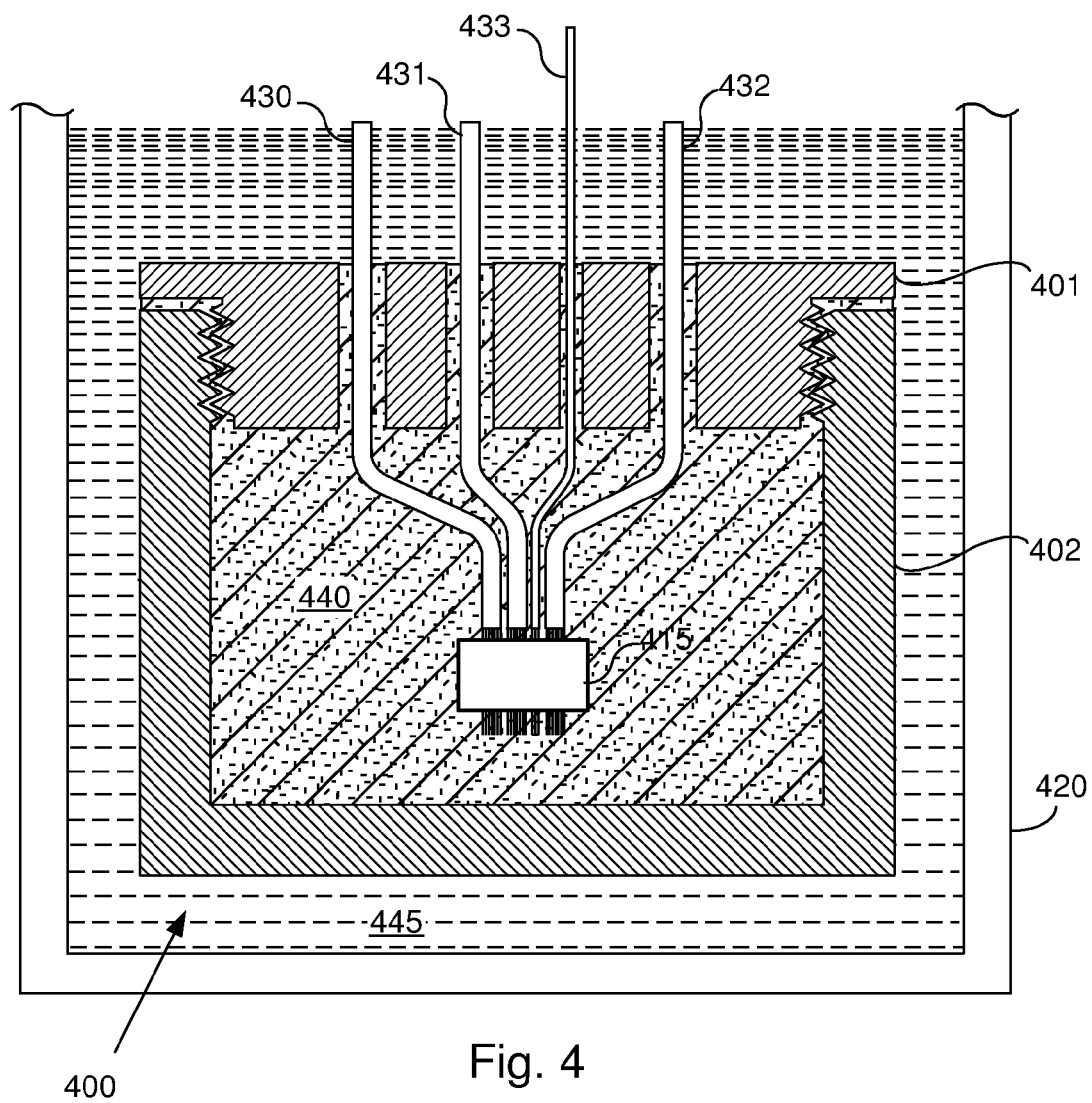
FIG. 4 is a diagram illustrating the structure of a Y-point insulating apparatus in accordance with a first embodiment of the present invention.

Referring to FIG. 4, a diagram illustrating the structure of an apparatus in accordance with a first embodiment of the present invention is shown. Conductors 430-432 are connected to the three coils of a three-phase induction motor. Conductors 430-432 have a layer of electrical insulation that covers all but an end portion of each conductor. The end portions of each of conductors 430-432 are joined and secured to each other by a metal band that is crimped over the end portions of the conductors. This junction of conductors 430-432 forms the Y-point of the motor.

A fourth conductor 433 is also shown in the figure. This conductor is electrically connected between the Y-point and a gauge package (not shown in the figure) in order to provide a DC voltage which exists at the Y-point to the gauge package. This DC voltage provides power to the gauge package and may also allow the gauge package to communicate with surface equipment as explained above. Conductor 433 is covered by a layer of electrical insulation, except for an end portion, which is crimped together with the end portions of conductors 430-432.

In this embodiment, an enclosure 400 is formed by a top cap 401 and a bottom cap 402. Top cap 401 and bottom cap 402 are preferably made of an insulating material, such as PEEK (polyether ether ketone). Bottom cap 402 has an upper portion which is internally threaded. Top cap 401 has a portion which is externally threaded so that it can be screwed onto bottom cap 402 to form enclosure 400. Top cap 401 has four holes (apertures) which extend through it from top to bottom. These holes form passageways through which conductors 430-433 can extend from the Y-point to the exterior of the enclosure.

When the motor is assembled, conductors 430-433 are passed through the holes in top cap 401 and are crimped together at the Y-point with a metal band 415. Before top cap 401 is assembled with bottom cap 402, an electrically insulating substance such as potting compound 440 is placed in the bottom cap and around the Y-point. As top cap 401 is screwed onto bottom cap 402, the potting compound is forced to fill the voids in the cavity that is formed within enclosure 400. As depicted in this figure, the potting compound also fills gaps between top cap 401 and bottom cap 402, as well as gaps between conductors 430-433 and the holes through top cap 401. This seals the gaps and completes the insulating barrier that is formed by enclosure 400 around the Y-point.

When enclosure 400 has been sealed around the Y-point, the remainder of the motor can be assembled in a conventional fashion. Enclosure 400 fits within the housing 420 of the motor. In this embodiment, the motor housing is filled with oil 445 when it is assembled. Thus, there are three layers of insulating material between the Y-point and the motor housing, including potting compound 440, enclosure 400 and the oil that fills the cavity between the enclosure and the motor housing.

Figure 5:
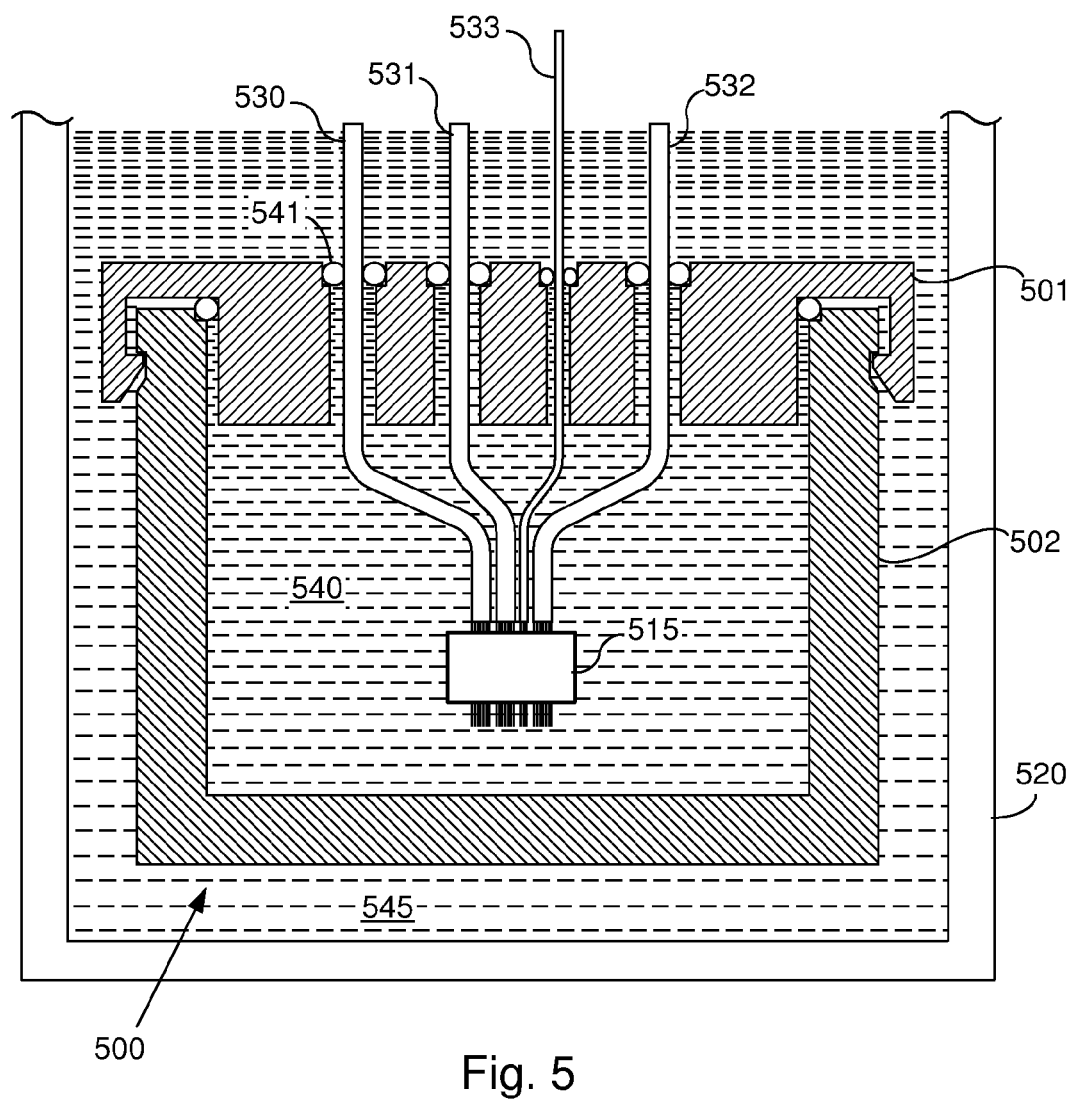
FIG. 5 is a diagram illustrating the structure of a Y-point insulating apparatus in accordance with an alternative embodiment of the present invention.

Various alternative embodiments are also possible. Referring to FIG. 5, a diagram illustrating an apparatus in accordance with one alternative embodiment of the present invention is shown. The conductors connected to the coils of the motor are indicated in the figure as 530-532. Again, a fourth conductor 533 is provided to carry power to a gauge package attached to the motor, and possibly to allow the gauge package to communicate with surface equipment through the power cable. The end portions of conductors 530-533 are crimped together with a metal band to form the Y-point.

In this embodiment, enclosure 500 is again formed by a top cap 501 and a bottom cap 502, both of which are made of an insulating material. In this embodiment, however, the top and bottom caps are designed to snap together for ease of assembly. Top cap 501 again has four holes which extend through the cap to form passageways through which conductors 530-533 can extend.

When the embodiment of FIG. 5 is assembled, conductors 530-533 are passed through the holes in top cap 501 and are crimped together at the Y-point by metal band 515. In this embodiment, oil 540, rather than potting compound, will be used to fill the cavity within enclosure 500. In order to keep the oil from flowing out of the enclosure, seals such as o-rings (e.g., 541) are positioned around each of conductors 530-533. The o-rings also serve to prevent contaminants from entering enclosure 500 and contaminating the oil in the enclosure. The o-rings are compressed between the conductors and top cap 501 to form a physical seal between them.

When enclosure 500 has been assembled around the Y-point, assembly of the motor is completed (including filling the motor housing with oil 545. This embodiment again provides three layers of insulating material between the Y-point and the motor housing, including the oil within enclosure 500, the enclosure itself, and the oil that fills the cavity between the enclosure and the motor housing.

It should be noted that the foregoing disclosure describes one exemplary embodiment, and that the specific structures, characteristics and features may vary in alternative embodiments. For example, while the embodiments described above utilize top and bottom caps that are snapped or screwed together to form the enclosure, the enclosure may have any suitable shape and any suitable closure means. Further, the enclosure may be formed from any suitable material, although a rigid insulating material is preferred. Similarly, the seals between the conductors and the holes through the enclosure may be made of any suitable material, such as the o-rings or potting compound of the above embodiments.

The enclosure in the foregoing embodiments is filled with potting compound or oil. While it is not necessary to fill the enclosure in this manner, it is preferred to do so because these materials serve not only to provide additional electrical insulation, but also to prevent collapse of the enclosure as pressure external to the motor and the enclosure increases. Many other variations may also be apparent to a person of ordinary skill in the art upon reading the present disclosure.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and recited within the following claims.

What is claimed is:

1. An apparatus for insulating a Y-point in a three-phase electric motor, the apparatus comprising:
    an electrically insulating enclosure, wherein the enclosure forms a cavity which accommodates a Y-point junction of a three-phase motor;
    one or more apertures through the enclosure, wherein the apertures enable three conductors which are connected at the Y-point junction to extend from the cavity to an exterior of the enclosure; and
    one or more insulating seals, wherein each of the seals is formed at a corresponding one of the apertures, and wherein the enclosure and the seals provide an electrically insulating barrier between the Y-point junction and the exterior of the enclosure.

2. The apparatus of claim 1, wherein the enclosure comprises a top cap and a bottom cap, wherein the top cap and bottom cap are configured to be secured to each other, thereby forming the enclosure.

3. The apparatus of claim 2, wherein the top cap and bottom cap are formed of a rigid electrically insulating material.

4. The apparatus of claim 1, wherein the seals comprise o-rings.

5. The apparatus of claim 1, wherein the seals comprise potting compound.

6. The apparatus of claim 1, further comprising an insulating material which substantially fills the cavity formed within the enclosure.

7. The apparatus of claim 6, wherein the insulating material comprises potting compound.

8. The apparatus of claim 6, wherein the insulating material comprises oil.

9. The apparatus of claim 1, wherein the apertures through the enclosure are further configured to enable an instrument power conductor to extend from the cavity within the enclosure to the exterior of the enclosure.

10. The apparatus of claim 1, wherein the Y-point junction within the cavity of the electrically insulating enclosure is electrically isolated from an exterior of the electrically insulating enclosure.

11. An electric submersible pump system for downhole applications, the system comprising:
    a pump; and
    a motor coupled to the pump and configured to drive the pump,
        wherein the motor is Y-wound and utilizes three-phase power, wherein the motor includes an electrically insulating enclosure which forms a cavity that accommodates a Y-point junction of the motor, wherein the enclosure has one or more apertures therethrough which enable three conductors which are connected at the Y-point junction to extend from the cavity to an exterior of the enclosure, and wherein the enclosure has one or more insulating seals at the apertures which provide an electrically insulating barrier between the Y-point junction and the exterior of the enclosure.

12. The system of claim 11, further comprising an insulating material which substantially fills the cavity formed within the enclosure.

13. The system of claim 11, wherein the motor further comprises a motor housing within which the enclosure is positioned, wherein a space between the enclosure and the motor housing is filled with oil.

14. A method for insulating a Y-point within a three-phase induction motor, the method comprising:

providing an electrically insulating enclosure, wherein the enclosure forms a cavity that accommodates a Y-point junction of a three-phase motor and has one or more apertures that extend from a cavity within the enclosure to an exterior of the enclosure;

positioning three conductors through the apertures, wherein the three conductors extend from coils of the motor to a Y-point junction; and enclosing the Y-point junction within the enclosure, wherein the apertures of the enclosure are sealed and the enclosure forms an electrically insulating barrier between the cavity within the enclosure and the exterior of the enclosure.

15. The method of claim 14, further comprising filling the enclosure with an electrically insulating material prior to enclosing the Y-point junction within the enclosure.

16. The method of claim 15, wherein the insulating material comprises potting compound.

17. The method of claim 15, wherein the insulating material comprises oil.

18. The method of claim 14, further comprising positioning the enclosure within a housing of the motor and filling a remaining cavity within the housing with oil.

19. The method of claim 14, further comprising positioning an instrument power conductor through the apertures, wherein the instrument power conductor extends from the Y-point junction to the exterior of the enclosure.

20. The apparatus of claim 10, wherein the electrically insulating enclosure is contained within a housing of the three-phase electric motor, and wherein the electrically insulating enclosure is insulated from the housing by a layer of oil.

* * * * *